United States Patent
Kim et al.

(10) Patent No.: US 12,502,349 B2
(45) Date of Patent: Dec. 23, 2025

(54) TOOTHPASTE FOR PREVENTING COLD TEETH AND PERIODONTAL DISEASES AND MANUFACTURING METHOD THEREFOR

(71) Applicants: Cheon-Gyun Kim, Ansan-si (KR); Chang-Mi Kim, Seoul (KR)

(72) Inventors: Cheon-Gyun Kim, Ansan-si (KR); Chang-Mi Kim, Seoul (KR)

( * ) Notice: Subject to any disclaimer, the term of this patent is extended or adjusted under 35 U.S.C. 154(b) by 798 days.

(21) Appl. No.: 17/624,301

(22) PCT Filed: Jun. 26, 2020

(86) PCT No.: PCT/KR2020/008335
§ 371 (c)(1),
(2) Date: Dec. 31, 2021

(87) PCT Pub. No.: WO2021/002637
PCT Pub. Date: Jan. 7, 2021

(65) Prior Publication Data
US 2022/0354774 A1    Nov. 10, 2022

(30) Foreign Application Priority Data
Jul. 1, 2019 (KR) ........................ 10-2019-0078729

(51) Int. Cl.
*A61K 8/98* (2006.01)
*A61Q 11/00* (2006.01)

(52) U.S. Cl.
CPC .............. *A61K 8/987* (2013.01); *A61K 8/981* (2013.01); *A61Q 11/00* (2013.01)

(58) Field of Classification Search
CPC ......... A61K 8/987; A61K 8/981; A61Q 11/00
See application file for complete search history.

(56) References Cited

U.S. PATENT DOCUMENTS

2010/0143271 A1*  6/2010  Yang ........................ A61K 8/24
                                                    423/307

FOREIGN PATENT DOCUMENTS

| CN | 101161229    | * | 4/2008  |
|----|--------------|---|---------|
| CN | 105342894    | * | 2/2016  |
| CN | 108969456    | * | 12/2018 |
| CN | 108969459    | * | 12/2018 |
| JP | H09-59137 A  |   | 3/1997  |
| JP | H11279037 A  |   | 10/1999 |
| JP | 2000-072610 A|   | 3/2000  |
| JP | 2001-131049 A|   | 5/2001  |
| JP | 2002-370954 A|   | 12/2002 |
| JP | 2018-197207 A|   | 12/2018 |
| KR | 10-2000-0017999 A | | 4/2000 |
| KR | 10-2002-0045307 A | | 6/2002 |
| KR | 10-1150309 B1 | | 6/2012 |

(Continued)

*Primary Examiner* — Jianfeng Song
(74) *Attorney, Agent, or Firm* — Maschoff Brennan

(57) ABSTRACT

The present invention relates to a toothpaste for preventing cold teeth and periodontal diseases and a manufacturing method therefor, in which a toothpaste containing minerals that have lost electrons is used, wherein the toothpaste has excellent therapeutic and preventive effects on various types of mouth diseases since a principle that minerals (metallic) that have lost electrons tend to take electrons from other atoms to be stabilized, that is, covalently bonded or coordinated, is applied to the toothpaste.

2 Claims, 1 Drawing Sheet

(56) References Cited

FOREIGN PATENT DOCUMENTS

| | | |
|---|---|---|
| KR | 10-2016-0012257 A | 2/2016 |
| KR | 10-2017-0029106 A | 3/2017 |
| KR | 10-1818530 B1 | 1/2018 |
| KR | 10-2018-0098754 A | 9/2018 |

\* cited by examiner

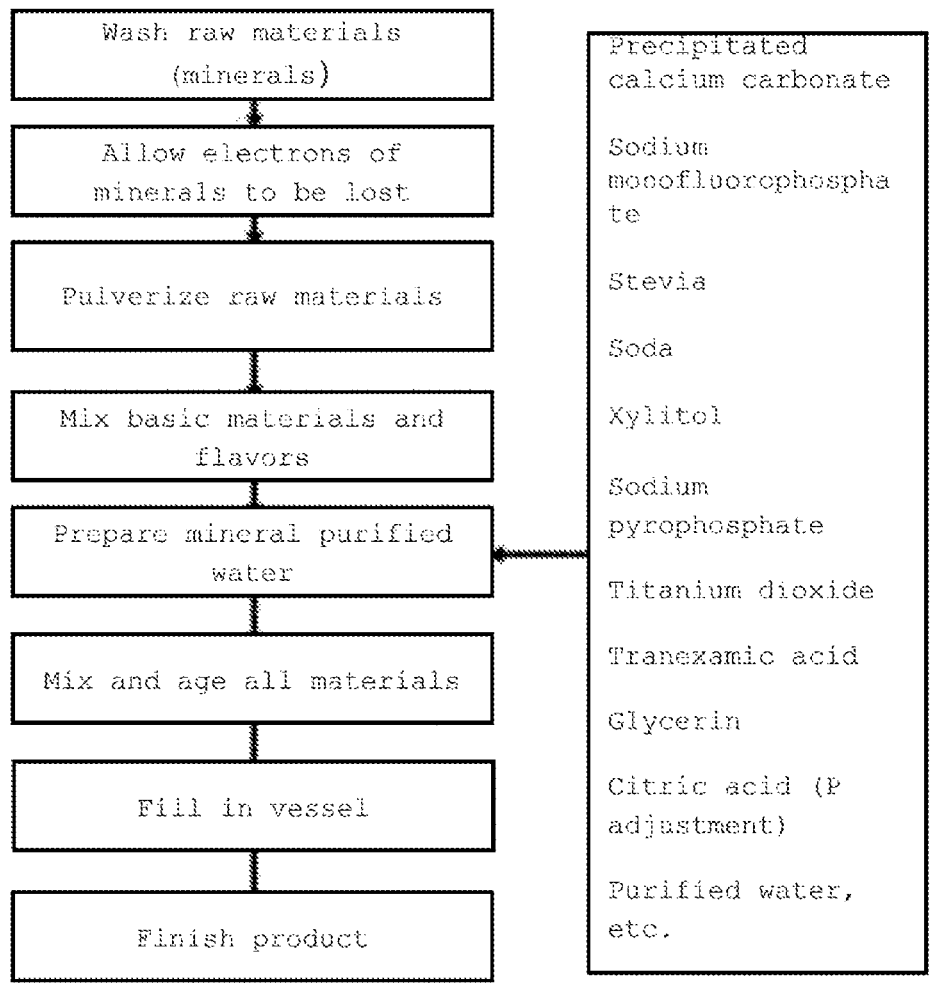

TOOTHPASTE FOR PREVENTING COLD TEETH AND PERIODONTAL DISEASES AND MANUFACTURING METHOD THEREFOR

TECHNICAL FIELD

The present invention relates to a toothpaste for preventing the cold teeth and periodontal diseases and a manufacturing method therefor, and more specifically, to a toothpaste for preventing the cold teeth and periodontal diseases and a manufacturing method therefor by using a toothpaste containing minerals that have lost electrons, in which a toothpaste containing minerals that have lost electrons is used, wherein the toothpaste has excellent therapeutic and preventive effects on various types of mouth diseases since a principle that minerals (metallic) that have lost electrons tend to take electrons from other atoms to be stabilized, that is, covalently bonded or coordinately bonded, is applied to the toothpaste.

In particular, the present invention relates to a toothpaste for preventing the cold teeth and periodontal diseases and a manufacturing method therefor by using a toothpaste containing minerals that have lost electrons, wherein when various minerals (metallic) extracted from food lose electrons and are added to a toothpaste composition, the minerals (metallic) that have lost electrons are covalently or coordinately bonded to a surface of worn and damaged teeth, so it not only forms a strong metallic film on the teeth, but also covalently bonds to the dentin tubule, resulting in an excellent sealing effect, so that it can relieve the irritation to sensitive teeth, such as a sore tooth, in a short period of time, and since the teeth that may be gradually worn and damaged as they are used are coated (plated) with minerals (Fe, Cu, Zn, etc.) more and more thickly, sore teeth can be healed in a short period of time, worn or damaged teeth can be restored, and plaque and tartar can be removed because the toothpaste can covalently bond to the plaque and tartar.

In addition, the present invention relates to a toothpaste for preventing the cold teeth and periodontal diseases and a manufacturing method therefor by using a toothpaste containing minerals that have lost electrons, in which the strong alkalinity of minerals that have lost electrons can change environment into an alkaline environment where causative organisms of gum disease, tooth decay, and halitosis growing in an acidified oral environment cannot survive, thereby preventing the growth of various bacteria without any side effects and representing high effectiveness in cure and prevention of various periodontal diseases.

BACKGROUND ART

A toothpaste is a quasi-drug used when brushing the surface of teeth, and it is mainly used for the purpose of whitening, sterilizing, and interdental cleaning effects. To this end, the toothpaste contains ingredients such as abrasives, wetting agents, foaming agents, sweeteners and the like.

Such a toothpaste is being developed to have various functions for oral health in addition to simply cleaning the teeth, and for example, have a function to prevent tooth hypersensitivity (such as a cold tooth phenomenon).

The tooth hypersensitivity is a feeling of sensitivity when the enamel of the tooth is worn or damaged and the dentin is exposed and comes into contact with cold air or stimulant food and the symptoms thereof can range from mild to intense and persistent pain.

The severity of symptoms varies depending on the degree of exposure of the dentinal tubules. A tooth can be divided into the enamel layer on the outer surface, the dentin just below the enamel layer, the pulp where nerves and blood vessels are distributed, and the gum tissue that protects the teeth. However, if the enamel layer is damaged due to incorrect brushing, gum disease, or tooth decay, or when the dentin is exposed due to a dent in the gum, external stimulation is transmitted to the tooth nerve through the dentin tubule, causing short but intense and strong pain. In particular, these days, the symptoms of cold teeth are increasing even among young people, and treatment is required from the initial stage.

Meanwhile, in order to prevent dental caries, fluoride having a concentration of 0.05 to 0.1 w/v % is often used in the toothpaste or mouthwash liquid, however, recent reports show that long-term and repeated use of fluoride compounds may promote inflammation in the gum although the use of fluoride compounds in the toothpaste or mouthwash liquid can prevent dental caries.

In order to solve the above disadvantages, various toothpastes have been developed, examples of which include Patent Documents 1 to 3.

Korean Patent Registration No. 10-1150309, which is Patent Document 1, discloses a manufacturing method of herbal extract for preventing periodontal disease and dental calculus which includes the steps of i) extracting 20 to 25 weight % of barberry root, 20 to 25 weight % of phalanx, 15 to 20 weight % of tribulus terrestris, 30 to 35 weight % of taraxacum herb, and 4 to 7 weight % of licorice with alkaline ionized water having a pH of 7 to 10 as a solvent at 40 to 85° C. for 1 to 5 hours; and ii) adding 10 to 30 g of calcium oxide based on 100 ml of the extracted filtrate, stirring, and then leaving it at 4 to 5° C. for 12 to 24 hours to filter the supernatant.

Korean Unexamined Patent Publication No. 10-2017-0029106, which is Patent Document 2, discloses a method of preparing lactic acid bacterium fermented herbal extract for preventing and improving tooth decay, periodontal disease, and halitosis, which includes the steps of (a) preparing a fermentation raw material by drying and powdering herbs and then sterilizing the herbs at a high temperature; (b) obtaining a fermented product by inoculating and fermenting vegetable lactic acid bacteria into the fermentation raw material obtained in the above step; (c) centrifuging the fermented product obtained in the above step to obtain a fermented broth; (d) extracting the fermented broth obtained in the above step with an extraction solvent to obtain a fermented extract; and (e) filtering the fermented extract obtained in the above step with a filter paper.

Korean Patent No. 10-1818530, which is Patent Document 3, discloses a toothpaste composition comprising 2 to 10 parts by weight of lettuce powder, 2 to 10 parts by weight of oat powder, 1 to 5 parts by weight of kaolin clay, 0.5 to 2 parts by weight of turmeric powder, 0.9 parts by weight of powder of houttuynia cordata, and 0.005 to 0.1 parts by weight of sulfur powder.

However, although the conventional toothpastes have various functionalities, there is a disadvantage in that the use of fluoride promotes inflammation and has limitations in reducing caries.

DISCLOSURE

Technical Problem

The present invention has been developed to solve the above problems of the prior art, and an object of the present invention is to provide a toothpaste composition which can fundamentally prevent the periodontal disease by blocking or coating the worn or damaged dentinal tubule through the covalent bonding of minerals that have lost electrons to alleviate the hypersensitivity of the cold tooth, and another object of the present invention is to provide a toothpaste for preventing the cold teeth and periodontal diseases and a manufacturing method therefor, which can inhibit the proliferation of *Streptococcus mutans* bacteria, which are causative bacteria causing dental caries, and can improve the antibacterial effect.

In addition, another object of the present invention is to provide a toothpaste for preventing the cold teeth and periodontal diseases and a manufacturing method therefor, which does not use fluoride and is saccharin-free and preservative-free, so it not only improves safety for users who are sensitive to chemical components, but also has the effect of curing and preventing various oral and gum diseases.

Technical Solution

In order to accomplish the above objects, the present invention provides a toothpaste containing minerals that have lost electrons, wherein 0.5 to 15% of minerals that have lost electrons are added based on a total weight of a toothpaste composition.

At least three types of minerals are preferably provided.

A method of manufacturing a toothpaste containing minerals that have lost electrons includes: washing the minerals; ionizing to prepare the minerals that have lost electrons; pulverizing the minerals that have lost electrons; mixing a composition by mixing flavors, minerals that have lost electrons and organic acid to a basic material of the toothpaste; preparing purified mineral water by mixing the pulverized minerals that have lost electrons with purified water; and aging by mixing the mixed composition with the purified mineral water.

Preferably, 0.1 to 15% of the minerals that have lost electrons are contained based on a total weight of a toothpaste composition.

The minerals that have lost electrons may be prepared by heating at least one of foods and herbal medicines containing a large amount of minerals and mineral-containing materials at 850° C. or higher for 15 minutes or more to cause the minerals to lose the electrons.

The purified mineral water may be prepared by mixing 1 to 50 weight % of organic acid and 1 to 50 weight % of minerals that have lost electrons based on a total weight of purified water.

The herbal medicine may be at least one of a bovine bone, an osterea testa raw material, and a *Cassia occidentalis* raw material.

Advantageous Effects

According to the toothpaste for preventing the cold teeth and periodontal disease of the present invention, the mineral film can be formed on the teeth because the minerals that have lost electrons form a covalent bond or a coordination bond with electrons of other elements for the purpose of stabilization, so the treatment and prevention effects for various oral diseases can be obtained by the film formed on the teeth.

In particular, the present invention not only forms a strong metallic film on the teeth, but also has a covalent bond to the dentin tubules to seal the dentinal tubules so that it has the effect of alleviating the irritation to the sensitive teeth such as the cold teeth in a short period of time.

In addition, the present invention has the effect of inhibiting and preventing the growth of causative bacteria for the gum disease, tooth decay, halitosis, etc. that survive in the oral cavity because the strong alkalinity of the minerals that have lost electrons can change the acidified oral environment into the alkaline environment.

DESCRIPTION OF DRAWINGS

FIG. 1 is a block diagram for explaining a method of manufacturing a toothpaste for preventing the cold teeth and periodontal diseases according to the present invention

BEST MODE

Mode for Invention

Various changes can be made to the present invention and the present invention may have various embodiments. Specific embodiments are illustrated in the drawings and will be described through the detailed description. However, this is not intended to limit the present invention to specific embodiments, and it should be understood that all modifications, equivalents, and substitutes may be fall within the spirit and scope of the present invention.

The similar reference numerals are used for similar components throughout the drawings. In the following description of the present invention, if it is determined that a detailed description of a related known technology may obscure the gist of the present invention, the detailed description thereof will be omitted.

The present invention can provide a toothpaste capable of treating and preventing various oral diseases and gum diseases.

The toothpaste containing the mineral that has lost electrons according to the present invention is characterized in that 0.5 to 15% of the minerals that have lost electrons are added based on the total weight of the toothpaste composition.

When the amount of minerals that have lost electrons is 0.1 wt % or less, the coating effect on the tooth surface is insignificant, and when the amount of minerals that have lost electrons is 15 wt % or more, the alkalinity becomes too strong so that there is a risk that the gums may be peeled off.

Accordingly, it is preferable to add the minerals that have lost electrons within the above range, and optimally, it is added in an amount of 3 to 9 weight % based on the total weight of the toothpaste.

In addition, the minerals that have lost electrons may be in the form of a powder, and in this case, it is preferable that the particle diameter is the range of 1.0 to 2.5 μm.

At least three types of minerals may be used, and the types of minerals may be at least one of foods and herbal medicines containing a large amount of minerals and mineral-containing materials.

The herbal medicine containing the minerals may be at least one of a bovine bone, an osterea testa raw material, and a *Cassia occidentalis* raw material.

The minerals that have lost electrons may be prepared by heating a mineral raw material at 850° C. or higher for 15 minutes or more so that the mineral loses electrons.

As shown in FIG. 1, the method of manufacturing a toothpaste containing minerals that have lost electrons includes: washing the minerals; ionizing to prepare the minerals that have lost electrons; pulverizing the minerals that have lost electrons; preparing a basic composition by mixing flavors to a basic material of the toothpaste; preparing purified mineral water by mixing the pulverized minerals that have lost electrons with purified water; and aging by mixing a mixed composition with the purified mineral water.

The toothpaste prepared as shown in FIG. 1 is completed as a product by filling the toothpaste in a container.

The minerals that have lost electrons are added in an amount of 0.1 to 15% based on the total weight of the toothpaste composition, but as described above, the optimal mixing ratio is preferably 3 to 9 weight % based on the total weight of the toothpaste.

The minerals that have lost electrons may be prepared by using at least one of foods and herbal medicines containing a large amount of minerals and mineral-containing materials.

According to the method for producing the minerals that have lost electrons, a raw material containing the minerals is heated at 850° C.° or higher for 15 minutes or more to cause the minerals to lose electrons.

heated at 1250° C. for 25 minutes to cause the minerals to lose more than 93% of electrons. After taking out the raw materials, the raw materials were pulverized by a pulverizer (Halide SB-4, Sweden) for 10 minutes and 10% of the raw materials was stirred in distilled water (20° C.), and the resulted solution was treated with ozone for residual discoloration and odor removal.

(4) Then, purified water in which a large amount of minerals that have lost electrons is dissolved was prepared by adding 1 to 50 weight % of organic acids and 1 to 50 weight % of minerals that have lost electrons in the purified water (it is not necessary to use the prepared purified water, and it can be used only when it is necessary to lower the pH while increasing the content of minerals that have lost electrons).

2. Preparation of Toothpaste Containing Minerals that have Lost Electrons

TABLE 1

Composition ratio of toothpaste composition containing minerals that have lost electrons

| No. | Ingredient name | Comparative Example 1 | Example 1 | Example 2 | Example 3 |
|---|---|---|---|---|---|
| 1 | Precipitated Calcium Carbonate | 37 | 25 | 25 | 15 |
| 2 | Glycerin | — | 50 | — | — |
| 3 | Sorbitol | 40 | — | 40 | 34 |
| 4 | Xylitol | 1.5 | 1.0 | 2.0 | 2.0 |
| 5 | Sodium pyrophosphate | 2.5 | 0.48 | 2.0 | 3.0 |
| 6 | Citric acid | | 0.1 | | 4.0 |
| 7 | Sodium carboxymethylcellulose | 1.5 | 1.0 | 1.5 | 1.0 |
| 8 | Tranexamic acid | 0.5 | 0.5 | 0.5 | 0.5 |
| 9 | Flavor | 1.0 | 1.5 | 1.0 | 1.0 |
| 10 | Minerals that have lost electrons | — | 0.01 | 3.0 | 6.0 |
| 11 | Purified water of (4) | Residue | Residue | Residue | Residue |
| 12 | Total | 100 | 100 | 100 | 100 |

The purified mineral water may be prepared by mixing 1 to 50 weight % of an organic acid and 1 to 50 weight % of the minerals that have lost electrons based on the total weight of purified water.

Hereinafter, examples of the method for manufacturing toothpaste by the above method will be described.

EXAMPLE

1. Materials and Methods (1) The toothpaste composition contains a wetting agent (glycerin, sorbitol solution), a foaming agent (sodium lauryl sulfate), a sweetener (xylitol), an active ingredient (propolis), a fragrance (menthol), a solvent (purified water), a brightener (titanium dioxide) and the basic materials constituting the toothpaste were purchased from the market.
(2) Minerals that have lost electrons were prepared by purchasing bovine bones, abalone, and oysters.
(3) Preparing of minerals that have lost electrons—raw materials of (2) was put in an electric furnace and A toothpaste was prepared by mixing the components in the composition ratio as shown in above Table 1

3. Experiment for Halitosis Removal Effect

After selecting 20 males and females who are aware that they have halitosis as clinical test subjects, they ate the same type of foods, and the degree of halitosis was quantified by using a halimeter (model SB-17, USA). Then, persons with weak halitosis (60 or less) and very strong halitosis (350 or more) were excluded from the test, and then the halitosis was measured with respect to five persons who belong to the groups of Comparative Examples and Examples, and the mean values were adjusted so that the average values were similar between two groups. For the purpose of reproducibility, in the next day, the initial halitosis was measured for 20 males and females when 30 minutes and 60 minutes have elapsed after the same meal. Then, after providing toothbrushes and toothpastes for each composition (Example), the tooth brushing was performed for 3 minutes in the same way and the final halitosis was measured after 30 minutes and 60 minutes have elapsed.

TABLE 2

| Treatment Group | Baseline | 30 minutes after meals | 60 minutes after meals |
|---|---|---|---|
| Comparative Example 1 | 200 | 150 | 170 |
| Example 1 | 200 | 140 | 160 |
| Example 2 | 210 | 134 | 145 |
| Example 3 | 210 | 130 | 140 |

Halitosis removal effect

The given value is the average value of two tests.
① In Comparative Example 1, when 30 minutes and 60 minutes have elapsed after meals, the rate of halitosis removal decreased by 15-25% compared to the baseline.
② Examples 1, 2, and 3 showed a decrease of about 26 to 35% compared to the baseline, and in particular, Example 3 showed the greatest decrease with a decrease of 31 to 39%.

4. Gingivitis Inhibition Test

This test was conducted on 20 subjects in relatively similar environment, and the primary oral examination was conducted for all subjects before the test to obtain a baseline. The test method was a single-blind method, and the same tooth cleaning agent and toothbrush were provided to all subjects during the residual effect removal period of 4 weeks before the test.

In the test, the gum was divided into buccal surface and lingual surface per one tooth to calculate the average value of the index. Each gingivitis was assessed from 0 to 3 points according to the Silness-Loe marking standard to obtain the gingival index for each tooth, after which average grade for gingival index of each entity was calculated, wherein the measurement for the test was taken a total of three times in one month interval.

TABLE 3

Comparison of Gingivitis Inhibition

| Treatment group | Baseline | After 2 months | After 4 months |
|---|---|---|---|
| Comparative Example 1 | 0.63 | 0.59 | 0.60 |
| Example 1 | 0.62 | 0.52 | 0.50 |
| Example 2 | 0.61 | 0.45 | 0.43 |
| Example 3 | 0.62 | 0.42 | 0.40 |

The given value is the average value of two tests.
① In Comparative Example 1, there was no significant change even after 2 to 4 months.
② In the case of Examples 1, 2, and 3, there was decrease of 8 to 33% after 2 months, and 21 to 37% after 4 months.
③ Example 3 showed the greatest decrease.

5. Comparison Test for Reducing Cold Teeth

This test was conducted on 25 subjects with relatively identical cold teeth, and all the subjects drank 9° C. cold water 5 times before the test, and the degree of irritation was precisely measured to obtain the baseline.

In the test, all the subjects were provided with the same tooth cleaning agent and the toothbrush of the same standard.

Tooth brushing was performed for 3 minutes in the morning and evening after meals, and after 1 month of use, the degree of irritation was measured.

TABLE 4

Comparison in reduction of cold teeth

| Treatment group | baseline | 1 month later | after 2 months |
|---|---|---|---|
| Comparative Example 1 | 100 | 98 | 97.5 |
| Example 1 | 100 | 92 | 90 |
| Example 2 | 100 | 15 | 10 |
| Example 3 | 100 | 7 | 2 |

The given value was averaged over two tests.
② In Comparative Example 1, there was no significant change even after 1 month and 2 months.
② Examples 1, 2, and 3 showed a decrease of 8 to 93% compared to the baseline after 1 month, and a decrease of 10 to 98% after 2 months.
③ Example 3 showed the greatest decrease.

The invention claimed is:

1. A method of manufacturing a toothpaste containing minerals that have lost electrons, the method comprising:
    washing the minerals;
    ionizing to prepare the minerals that have lost electrons;
    pulverizing the minerals that have lost electrons;
    preparing a basic composition by mixing flavors to a basic material of the toothpaste;
    preparing purified mineral water by mixing the pulverized minerals that have lost electrons with purified water;
    and aging by mixing a mixed composition with the purified mineral water,
    wherein the minerals that have lost electrons are prepared by heating at least one of foods and herbal medicines containing a large amount of minerals and mineral-containing materials at 1250° C. or higher to cause the minerals to lose the electrons, and
    wherein at least three types of minerals are used, and the herbal medicine containing the minerals is at least one of bovine bone, an osterea testa raw material, and a *cassia occidentalis* raw material,
    wherein 0.1 to 15% of the minerals that have lost electrons are contained based on a total weight of a toothpaste composition.

2. The method of claim 1, wherein the purified mineral water is prepared by mixing 1 to 50 weight % of organic acid and 1 to 50 weight % of minerals that have lost electrons based on a total weight of purified water.

* * * * *